(12) United States Patent
Heim

(10) Patent No.: US 8,920,957 B2
(45) Date of Patent: Dec. 30, 2014

(54) COOLING DEVICE FOR A BATTERY

(75) Inventor: Udo Heim, Leonberg (DE)

(73) Assignee: Dr. Ing. H.C.F. Porsche Aktiengesellschaft, Stuttgart (DE)

(*) Notice: Subject to any disclaimer, the term of this patent is extended or adjusted under 35 U.S.C. 154(b) by 161 days.

(21) Appl. No.: 13/153,664

(22) Filed: Jun. 6, 2011

(65) Prior Publication Data

US 2011/0318628 A1  Dec. 29, 2011

(30) Foreign Application Priority Data

Jun. 24, 2010  (DE) .......... 10 2010 017 561

(51) Int. Cl.
| | |
|---|---|
| *H01M 10/50* | (2006.01) |
| *H01M 10/613* | (2014.01) |
| *H01M 10/615* | (2014.01) |
| *H01M 10/625* | (2014.01) |
| *H01M 10/6551* | (2014.01) |
| *H01M 10/6554* | (2014.01) |
| *H01M 10/6556* | (2014.01) |
| *H01M 10/6563* | (2014.01) |
| *H01M 10/6568* | (2014.01) |
| *H01M 10/663* | (2014.01) |

(52) U.S. Cl.
CPC ...... *H01M 10/5004* (2013.01); *H01M 10/5006* (2013.01); *H01M 10/5016* (2013.01); *H01M 10/5046* (2013.01); *H01M 10/5053* (2013.01); *H01M 10/5057* (2013.01); *H01M 10/5067* (2013.01); *H01M 10/5077* (2013.01); *H01M 10/5095* (2013.01)
USPC ....................................... 429/120

(58) Field of Classification Search
USPC ............................................. 429/120
See application file for complete search history.

(56) References Cited

U.S. PATENT DOCUMENTS

| | | | | |
|---|---|---|---|---|
| 5,834,132 | A * | 11/1998 | Hasegawa et al. ........ | 429/62 |
| 2002/0028373 | A1 * | 3/2002 | Tschirch ................... | 429/81 |
| 2007/0009787 | A1 | 1/2007 | Straubel et al. | |
| 2007/0184320 | A1 * | 8/2007 | Domen ..................... | 429/26 |
| 2008/0292948 | A1 * | 11/2008 | Kumar et al. ............ | 429/120 |
| 2011/0020678 | A1 | 1/2011 | Straubel et al. | |

FOREIGN PATENT DOCUMENTS

| | | |
|---|---|---|
| DE | 74 39 582 | 4/1975 |
| DE | 603 05 221 | 3/2007 |
| DE | 10 2007 012 893 | 3/2008 |
| EP | 1 333 521 | 5/2006 |
| WO | 2006124663 | 11/2006 |

OTHER PUBLICATIONS

French Office Action—Apr. 15, 2014.

* cited by examiner

*Primary Examiner* — Ula C. Ruddock
*Assistant Examiner* — Jacob Marks
(74) *Attorney, Agent, or Firm* — Gerald E. Hespos; Michael J. Porco; Matthew T. Hespos

(57) ABSTRACT

A cooling device is provided for a battery (1). The cooling device has a housing (3). To further improve the cooling of batteries, in particular of high-voltage batteries for hybrid vehicles or electric vehicles, the housing (3) has a liquid-cooling arrangement and an air-cooling arrangement. For winter operation, a heating unit is integrated.

7 Claims, 1 Drawing Sheet

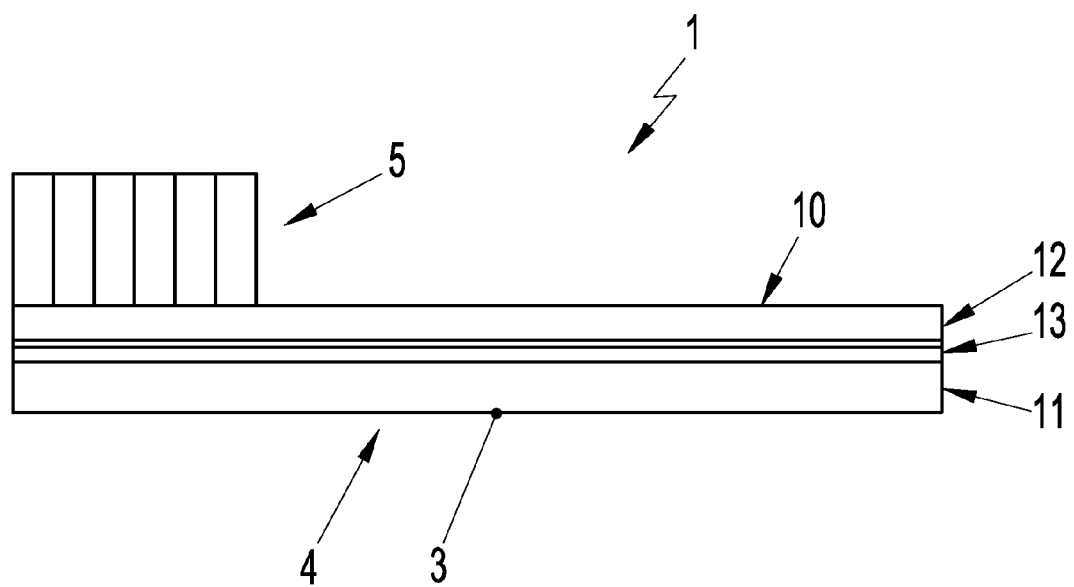

COOLING DEVICE FOR A BATTERY

CROSS REFERENCE TO RELATED APPLICATION

This application claims priority under 35 USC 119 to German Patent Application No. 10 2010 017 561.7 filed on Jun. 24, 2010, the entire disclosure of which is incorporated herein by reference.

BACKGROUND OF THE INVENTION

1. Field of the Invention.

The invention relates to a cooling device for a battery, having a housing with an air-cooling arrangement. The invention also relates to a battery having such a cooling device. The invention further relates to a motor vehicle with such a battery.

2. Description of the Related Art.

European patent EP 1 333 521 B1 discloses a battery device for a vehicle. The device has a temperature sensing plate fastened to the outside of a housing that is arranged between a secondary battery and the temperature sensing plate. Ventilation holes are provided for cooling the secondary battery in the housing. The known battery device comprises heating elements for heating the secondary battery. The heating elements are fastened to the temperature sensing plate.

It is an object of the invention to further improve the cooling of batteries, in particular of high-voltage batteries for hybrid vehicles or electric vehicles.

SUMMARY OF THE INVENTION

A cooling device is provided for a battery that has a housing. The housing comprises a liquid-cooling arrangement and an air-cooling arrangement. The combination of an air-cooling arrangement and a liquid-cooling arrangement improves the cooling power considerably in a simple manner without a second cooling liquid circuit being required. The cooling device of the invention enables improved cooling power to be provided even in the climates that have large seasonal temperature differences, in particular both in summer operation and also in winter operation.

The cooling device preferably comprises a first region with the air-cooling arrangement and a second region, separate from the first region, with the liquid-cooling arrangement. The region with the air-cooling arrangement preferably comprises cooling air ducts. The cooling air preferably is supplied from an external source and preferably from a region with no battery cells. In this way, undesired condensation problems in the region of the battery cells can be avoided.

The cooling device preferably comprises a third region with a heating unit. The heating unit functions to heat the battery at low temperatures, such as in winter operation.

The regions of the cooling device preferably are formed as layers of a plate-shaped cooling device to reduce manufacturing costs and the number of parts.

Battery cells preferably are arranged on the layer with the liquid-cooling arrangement. This arrangement has proven to be particularly advantageous within the context of the present invention.

The heating unit preferably is between the layer with the air-cooling arrangement and the layer with the liquid-cooling arrangement. The layer with the liquid-cooling arrangement preferably directly cools the battery cells. The layer with the air-cooling arrangement preferably cools the cooling device, which is designed as a cooling plate.

The heating unit preferably is an electric heating unit and may comprise at least one heating foil or the like that is laid or embedded into the layer with the heating unit.

The layer with the liquid-cooling arrangement preferably comprises a liquid-cooling circuit that may be operated, for example, with a refrigerant, such as tetrafluoroethane, carbon dioxide or a water-glycol mixture.

The invention also relates to a battery having a cooling device as described above. The battery preferably has a voltage of greater than 12 V, and may be a high-voltage battery.

The invention also relates to a motor vehicle having a battery as described above. The motor vehicle preferably is a hybrid vehicle (HEV, PHEV) or an electric vehicle.

Further advantages, features and details of the invention will emerge from the following description, in which various exemplary embodiments are described in detail with reference to the drawing.

BRIEF DESCRIPTION OF THE DRAWING

FIG. 1 is a highly simplified schematic illustration of a battery according to the invention with a cooling device according to the invention.

DETAILED DESCRIPTION OF THE PREFERRED EMBODIMENT

FIG. 1 shows, in highly simplified form, a battery 1 having a cooling device 4. The cooling device 4 comprises a housing 3 and battery cells 5 are arranged on the top side of the housing 3.

The cooling device 4 is designed as a cooling plate 10 with three regions 11, 12, 13 formed as layers of the substantially cuboidal cooling plate 10.

A liquid cooling circuit is integrated in the uppermost layer 12 of the cooling plate 10 and is operated with a refrigerant made, for example, of 1,1,1,2-tetrafluoroethane with the short code R134A. Alternatively, a water-glycol mixture may be used. The liquid-cooling circuit in the uppermost layer 12 cools the battery cells 5 in summer operation.

An electric heating unit is in the middle layer 13 and hence is arranged below the uppermost layer 12 and on the side of the uppermost layer facing away from the battery cells 5. The electric heating unit heats the battery cells 5 in winter operation. The electric heating unit comprises at least one heating foil that is laid or embedded into the middle layer 13.

The lowermost layer 11 is arranged so that the middle layer 13 is arranged between the two layers 11 and 12. Air ducts are integrated into the lowermost layer 11 and permit air cooling in winter operation.

The air for the air-cooling arrangement of the lowermost layer 11 is sucked in from an external source, and specifically and external source separate from the region with the battery cells 5. In this way, condensation problems caused by the external air can be avoided. Alternatively or additionally air may be sucked in from the interior space of a motor vehicle that has the battery. The air-cooling arrangement in the lowermost layer 11 functions to cool the cooling plate 10. To improve heat transfer, the cooling plate may have cooling ribs in the lowermost region 13.

The three regions 11, 12, 13 are regulated by temperature-dependent regulation in such a way that an optimum temperature of the battery cells 5 is ensured at all times. The cooling device 4 of the invention provides a compact and highly integrated facility for cooling and heating high-voltage batteries in electric vehicles or hybrid vehicles.

What is claimed is:

1. A cooling device for a battery comprising a plate-shaped housing with opposite first and second surfaces, an air-cooling layer adjacent the first surface of the housing and including cooling air ducts integrated therein, the air-cooling ducts being in communication with an external source separate from the battery, a liquid-cooling layer adjacent the second surface of the housing and including a liquid-cooling circuit arranged therein, a heating layer between the air-cooling layer and the liquid-cooling layer and including an electric heating unit, and battery cells on the second surface of the housing.

2. The cooling device of claim 1, wherein the cooling device is plate-shaped and the air-cooling arrangement and the liquid-cooling arrangement of the cooling device are formed as layers of the plate-shaped cooling device.

3. The cooling device of claim 2, wherein the electric heating unit comprises at least one heating foil laid on or embedded in the heating layer.

4. A battery having the cooling device of claim 1.

5. A motor vehicle having the battery of claim 4.

6. The cooling device of claim 2, wherein the layer with the air-cooling arrangement is arranged below the layer with the liquid-cooling arrangement.

7. The cooling device of claim 2, wherein the layer with the air-cooling arrangement further comprises cooling ribs.

\* \* \* \* \*